June 13, 1939.  W. J. WILLETT  2,162,188
REVERSE LOCK FOR MOTOR VEHICLES
Filed July 28, 1938
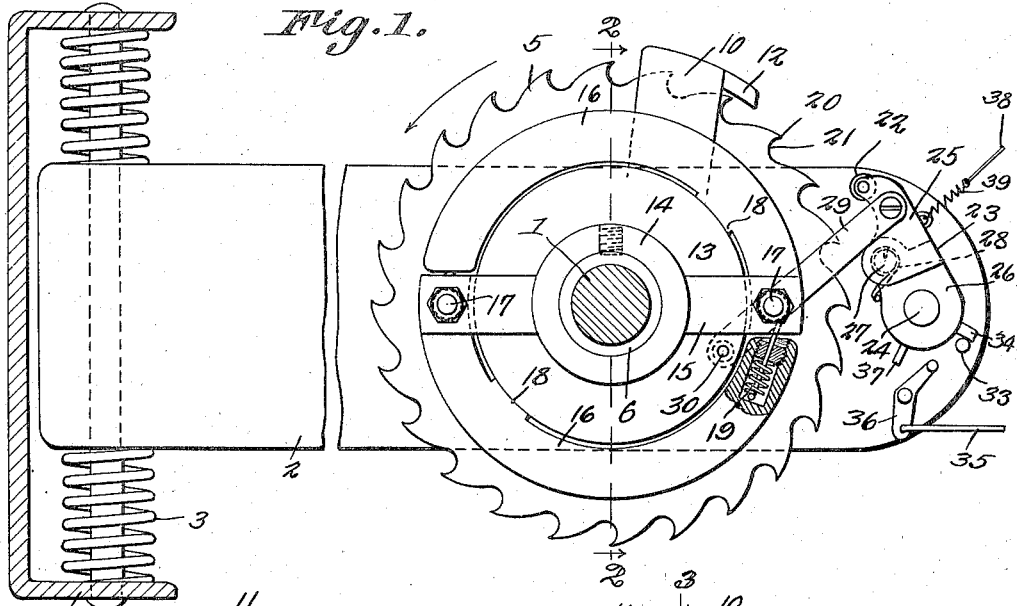
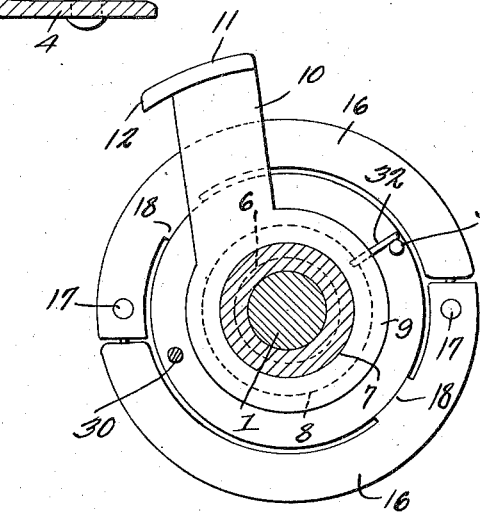
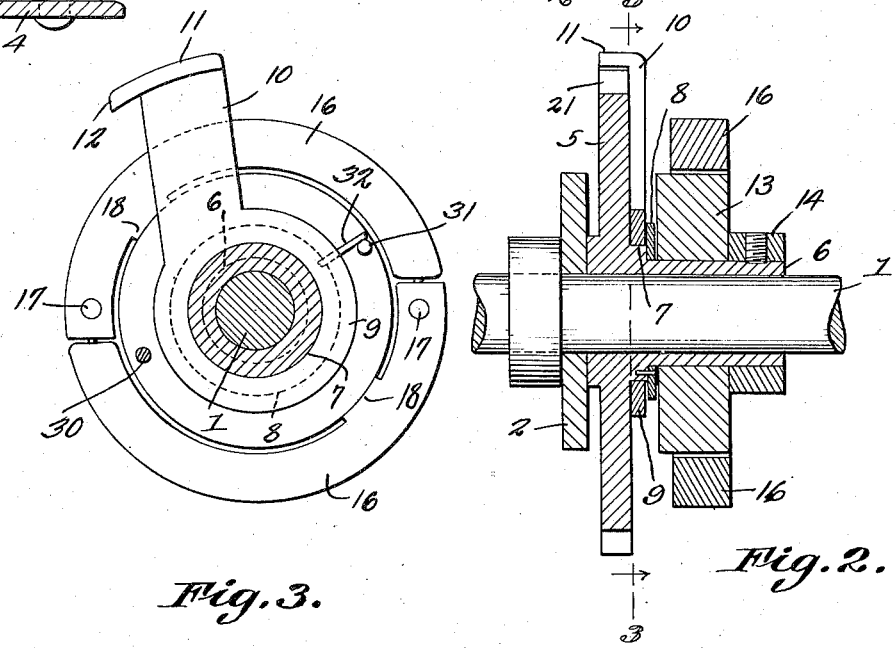
W. J. Willett
INVENTOR.
BY *CA Snow & Co.*
ATTORNEYS.

Patented June 13, 1939

2,162,188

UNITED STATES PATENT OFFICE 2,162,188

REVERSE LOCK FOR MOTOR VEHICLES

Wilbur J. Willett, Atlanta, Ga.

Application July 28, 1938, Serial No. 221,845

9 Claims. (Cl. 188—30)

This invention relates to a device for use in connection with the driving mechanism of a motor vehicle whereby, when the vehicle starts to move backwardly, it will be brought automatically to a stop, the device being especially advantageous while ascending a grade or incline as it prevents backward drifting while gears are being shifted. The device is also useful as a means for preventing accidental backward movement under any conditions, as, for example, when the vehicle is parked on an incline.

A further object is to provide means for holding the device out of locking position when it is desired to back the vehicle, there being a safety device movable automatically into position to prevent accidental actuation of the lock while the vehicle is being backed.

A still further object is to provide a structure of this character which is simple and compact in construction, can be installed readily in a vehicle, and will not readily get out of order.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is an elevation of the reverse lock, parts being broken away and the operating portions of the lock being shown in positions maintained thereby during the forward movement of the vehicle.

Figure 2 is a section on line 2—2, Figure 1.

Figure 3 is a section on line 3—3, Figure 2.

It is to be understood that this lock can be applied to any shaft of the vehicle adapted to be rotated while said vehicle is being moved either forwardly or backwardly. For example it can be mounted on the transmission shaft 1 and if this shaft is mounted for swinging movement, the base carrying the lock can be in the form of an elongated plate or bar 2 through which the shaft extends, as shown in Figure 2 while one end of said bar or plate can be movably supported between springs or cushions 3 in one channelled side 4 of the chassis of the vehicle. Thus while the plate 2 is held against displacement relative to the chassis it is nevertheless free to have any movement necessary as a result of the swinging movement of shaft 1.

A ratchet wheel 5 is secured to the shaft so as to rotate therewith and this wheel has a laterally extending hub 6 the inner end of which is stepped to provide an annular concentric shoulder 7. A spacing washer 8 is mounted on hub 6 and extends beyond shoulder 7 so as thus to hold in place a freely rotatable ring 9 having a radial arm 10 which extends along one face of wheel 5. The outer end of this arm has a laterally extending flange 11 constituting a guard which extends across the periphery of the wheel and a lip 12 projects from one side of the flange so as to constitute a continuation thereof. This lip also extends across the periphery of the wheel.

A friction drum 13 is journalled on the hub 6 and is retained thereon by a collar 14 suitably secured to the hub. This collar is provided with oppositely extending arms 15 each of which laps one end of an arcuate bar 16 to which it is pivotally connected, as at 17. The two bars 16 are oppositely disposed and embrace opposed portions of drum 13. Each bar may be provided with a friction shoe 18 for contacting with the periphery of drum 13 and these shoes may be maintained normally against said periphery by means of springs 19. One of these springs is mounted in one end of each bar 16 and is attached to the adjacent arm 15 for the purpose of resisting the action of centrifugal force when the device is in operation.

The periphery of wheel 5 is formed with ratchet teeth 20 preferably undercut as shown at 21 to provide rounded seats for the nose 22 of a pawl 23. This pawl is pivotally mounted at 24 on the plate 2 and is preferably formed of two members 25 and 26 pivotally connected at 27 and having any suitable spring means such as indicated generally at 28 normally against relative movement. The member 25 of the pawl normally abuts against member 26 and is connected by a link 29 to the drum 13 by a pivot pin 30. A stop pin 31 extends from the same side of the friction drum and this pin constitutes means for engagement by a finger 32 on ring 9 so as to limit the swinging movement of arm 10 away from pawl 23.

Under normal conditions the parts are located as shown in Figure 1 and during the forward movement of the vehicle to which the device is attached, the shaft 1 and the ratchet wheel 5 will rotate freely in the direction indicated by the arrow in said figure. As the collar 14 and arms 15 also rotate with the shaft and ratchet wheel, the arcuate clutch bars 16 carrying the shoes 18 will be swung outwardly by centrifugal force about their respective pivots 17 and against the action of their springs 19. Thus the shoes 18 will be maintained out of contact with drum 13. At the same time the frictional contact between hub 6 and drum 13 will tend to urge the drum 13 to rotate in the same direction as wheel 5 but such rotation will be prevented by the resistance set up by link 29 and pawl 23, the latter being limited in its outward swinging movement by any suitable means such as a stop pin 33 in the path of a finger 34 extending from the pawl. The rotation of wheel 5 in the direction indicated by the arrow also causes the arm or sweep 10 to move therewith until the finger 32 contacts with the stop 31.

As before stated the positions assumed by the parts at the start of forward movement of the vehicle are illustrated in Figure 1 and these positions will be maintained during such movement. Should the vehicle start to move backwardly either while parked or during a change of gears while moving up an incline, the slight rotation of shaft 1 in a clockwise direction as viewed in Figure 1 and resulting from this backward movement will cause drum 13 to move with the shaft because of its frictional contacts and this movement will result in pin 30 pulling through link 29 on pawl 23 and almost instantly seating the nose of the pawl back of the adjacent tooth 20 of the ratchet wheel. Consequently wheel 5 and shaft 1 will be locked against further movement in that direction and the vehicle will be held against backward drifting. It might be stated that the actuation of the drum during this backward movement is effected primarily by the gripping engagement of the shoes 18 with the periphery of the drum. Obviously when the vehicle is not in motion the springs 19 are relieved from centrifugal force so that they will act to clamp the shoe on the drum and insure its rotation and the actuation of the pawl.

As soon as the vehicle is started forwardly so as to rotate shaft 1 in the counterclockwise direction indicated by the arrow the device will operate as heretofore described to thrust the pawl out of engagement with wheel 5 and to maintain it in such position even after the shoes 18 have been disengaged from drum 13.

Should it be desired to back the machine, it would be necessary of course first to disengage the pawl from the ratchet wheel. Two means are preferably employed for this purpose. For example a rod 35 can be positioned where it will be shifted by the gear shift lever (not shown) when moved into reverse. This rod is connected to a lever 36 so located that when the gear shift is thrown into reverse, lever 36 will swing against a finger 37 on pawl 23 and swing the pawl outwardly from engagement with the ratchet wheel. As the two members of the pawl are pivotally connected to form a spring-restrained elbow joint, said pawl can slightly fold while being shifted so as to slip out of engagement with the seat 21 against which its nose is pressed.

Should it be desired to maintain the pawl 23 inactive, a yielding pull device such as a wire or cord 38 and a suitable spring 39 can be connected to the pawl and used for shifting and holding it.

When wheel 5 is moved in a clockwise direction during the backward movement of the vehicle the arm or sweep 10 will be carried therewith by friction and if the pawl is out of engagement with the wheel, the lip 12 of flange 11 will move into position between the ratchet teeth and the nose of the pawl so that it thus would not be possible to release the pawl into engagement with the ratchet wheel after the vehicle has reached such a backward speed that sudden engagement of the pawl with the ratchet wheel would cause damage. In other words arm 10 and the parts carried thereby constitute a safety device for preventing application of the pawl to the ratchet wheel under conditions where injury would result to the mechanism.

What is claimed is:

1. A reverse lock for motor vehicles including a ratchet wheel for attachment to a drive shaft, a pawl, a friction drum rotatable on the shaft, means operated by the drum when rotated in one direction, for moving the pawl into engagement with the ratchet wheel and, when rotated in the opposite direction, for disengaging the pawl from the wheel, and friction means for transmitting motion in either direction from the wheel to the drum, said means being releasable from the drum by centrifugal force during rotation in that direction in which disengagement of the pawl was effected.

2. A reverse lock for motor vehicles including a ratchet wheel for attachment to a drive shaft, a pawl, a friction drum rotatable on the shaft, means operated by the drum when rotated in one direction, for moving the pawl into engagement with the ratchet wheel and, when rotated in the opposite direction, for disengaging the pawl from the wheel, and friction means for transmitting motion in either direction from the wheel to the drum, said means being releasable from the drum by centrifugal force during rotation in that direction in which disengagement of the pawl was effected, supplemental means for holding the pawl disengaged from the wheel, and a safety device mounted for actuation by the wheel into position between the pawl and the wheel.

3. A reverse lock for motor vehicles including a ratchet wheel for attachment to a drive shaft, a pawl, a friction drum rotatable on the shaft, means operated by the drum when rotated in one direction, for moving the pawl into engagement with the ratchet wheel and, when rotated in the opposite direction, for disengaging the pawl from the wheel, and friction means for transmitting motion in either direction from the wheel to the drum, said means being releasable from the drum by centrifugal force during rotation in that direction in which disengagement of the pawl was effected, said wheel and drum having friction surfaces cooperating to urge the drum in the direction of rotation of the wheel to maintain the pawl in disengaged position while the drum is free from the friction means.

4. A reverse lock for motor vehicles including a ratchet wheel for attachment to a drive shaft, a pawl, a friction drum rotatable on the shaft, means operated by the drum when rotated in one direction, for moving the pawl into engagement with the ratchet wheel and, when rotated in the opposite direction, for disengaging the pawl from the wheel, and friction means for transmitting motion in either direction from the wheel to the drum, said means being releasable from the drum by centrifugal force during rotation in that direction in which disengagement of the pawl was effected, and means frictionally engaged by the wheel for actuation thereby toward the pawl when the wheel is rotated in one direction.

5. A reverse lock for motor vehicles including a ratchet wheel for rotation with a drive shaft, a pawl mounted on a fixed pivot, a friction drum rotatable relative to the wheel, means operated by the drum when rotated in one direction for moving the pawl into engagement with the ratchet wheel and, when rotated in the opposite direction, for disengaging the pawl from the wheel, and friction means for transmitting motion between the wheel and drum, said means including separate arms rotatable with the wheel, bars pivotally connected to the respective arms, friction shoes interposed between the bars and drum, and yielding means for maintaining the shoes normally in contact with the drum, said bars being positioned for release from the drum by centrifugal force during rotation of the drum in that direction in which disengagement of the pawl was effected.

6. A reverse lock for motor vehicles including a ratchet wheel for attachment to a drive shaft, a pawl, a friction drum rotatable on the shaft, means operated by the drum when rotated in one direction, for moving the pawl into engagement with the ratchet wheel and, when rotated in the opposite direction, for disengaging the pawl from the wheel, and friction means for transmitting motion in either direction from the wheel to the drum, said means being releasable from the drum by centrifugal force during rotation in that direction in which disengagement of the pawl was effected, means under the control of an operator for disengaging the pawl from the wheel, a sweep mounted for swinging movement and in frictional engagement with the wheel, and means on the sweep and movable by the wheel into position between the ratchet wheel and the pawl during the rotation of the wheel in one direction.

7. A reverse lock for motor vehicles including a ratchet wheel for attachment to a drive shaft, a jointed pawl, a friction drum rotatable on the shaft, means operated by the drum when rotated in one direction, for moving the pawl into engagement with the ratchet wheel and, when rotated in the opposite direction, for disengaging the pawl from the wheel, friction means for transmitting motion in either direction from the wheel to the drum, said means being releasable from the drum by centrifugal force during rotation in that direction in which disengagement of the pawl is effected, means for forcibly disengaging the jointed pawl from the ratchet wheel, and means under the control of said wheel for maintaining the pawl out of engagemnt therewith while the wheel is rotating toward the pawl.

8. A reverse lock for motor vehicles including a ratchet wheel for attachment to a drive shaft, a pawl mounted on a fixed pivot, a friction drum rotatable with the wheel, a link connection between one side of the drum and the pawl for transmitting motion from the drum to the pawl whereby the pawl will be moved into engagement with the ratchet wheel when the drum is rotated in one direction and disengaged from the wheel when the drum is rotated in the opposite direction, and friction means for transmitting motion in either direction from the wheel to the drum, said means being releasable from the drum by centrifugal force during rotation in that direction in which disengagement of the pawl is effected.

9. The combination with a drive shaft of a motor vehicle and a movably anchored member mounted thereon, of a reverse lock for motor vehicles including a ratchet wheel rotatable with the shaft, a pawl mounted on said member, a friction drum rotatable on the shaft, means operated by the drum when rotated in one direction, for moving the pawl into engagement with the ratchet wheel and, when rotated in the opposite direction, for disengaging the pawl from the wheel, and friction means for transmitting motion in either direction from the wheel to the drum, said means being releasable from the drum by centrifugal force during rotation in that direction in which disengagement of the pawl was effected.

WILBUR J. WILLETT.